(12) United States Patent
Terada et al.

(10) Patent No.: US 11,383,800 B2
(45) Date of Patent: Jul. 12, 2022

(54) MARINE VESSEL DISPLAY DEVICE, MARINE VESSEL, AND IMAGE DISPLAY METHOD FOR MARINE VESSEL

(71) Applicant: YAMAHA HATSUDOKI KABUSHIKI KAISHA, Iwata (JP)

(72) Inventors: Kohei Terada, Shizuoka (JP); Hirofumi Amma, Shizuoka (JP); Yoshimasa Kinoshita, Shizuoka (JP); Shimpei Fukumoto, Osaka (JP); Mitsuaki Kurokawa, Osaka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 16/812,474

(22) Filed: Mar. 9, 2020

(65) Prior Publication Data

US 2020/0298941 A1 Sep. 24, 2020

(30) Foreign Application Priority Data

Mar. 19, 2019 (JP) .............................. JP2019-051654

(51) Int. Cl.
*B60R 1/00* (2022.01)
*H04N 5/247* (2006.01)
*H04N 7/18* (2006.01)
*B63B 49/00* (2006.01)

(52) U.S. Cl.
CPC ............... *B63B 49/00* (2013.01); *B60R 1/00* (2013.01); *H04N 5/247* (2013.01); *H04N 7/18* (2013.01); *B60R 2300/102* (2013.01); *B60R 2300/105* (2013.01); *B60R 2300/303* (2013.01); *B60R 2300/607* (2013.01)

(58) Field of Classification Search
CPC ............... B60R 1/00; B60R 2300/102; B60R 2300/105; B60R 2300/303; B60R 2300/607; B63B 49/00; G01C 21/1656
See application file for complete search history.

(56) References Cited

U.S. PATENT DOCUMENTS

| | | | |
|---|---|---|---|
| 9,569,671 B1* | 2/2017 | Maali | G06K 9/00758 |
| 2010/0066516 A1* | 3/2010 | Matsukawa | B60R 1/00 340/435 |
| 2010/0092042 A1 | 4/2010 | Asari | |
| 2010/0225761 A1* | 9/2010 | Ishii | G01C 21/203 348/144 |
| 2012/0224063 A1* | 9/2012 | Terre | H04N 5/232945 348/148 |

(Continued)

FOREIGN PATENT DOCUMENTS

| | | |
|---|---|---|
| JP | 2010-093605 A | 4/2010 |
| JP | 4945177 B2 | 6/2012 |

*Primary Examiner* — Francis Geroleo
(74) *Attorney, Agent, or Firm* — Keating and Bennett, LLP

(57) ABSTRACT

A marine vessel display device includes an imager that images surroundings of a vessel body, an image processor that generates a bird's-eye view image based on images captured by the imager, a display provided in the vessel body and that displays the bird's-eye view image, and a controller. The controller is configured or programmed to perform a control to switch an image displayed on the display from the bird's-eye view image to an object image obtained by imaging in a direction toward an object from the vessel body based on object information.

20 Claims, 11 Drawing Sheets

(56) References Cited

U.S. PATENT DOCUMENTS

| | | | | |
|---|---|---|---|---|
| 2014/0313343 A1* | 10/2014 | Frank | ................. | G06T 7/70 |
| | | | | 348/164 |
| 2016/0092056 A1* | 3/2016 | Yang | ................. | G06K 9/00295 |
| | | | | 348/143 |
| 2016/0264227 A1* | 9/2016 | Kinoshita | ............ | G05D 1/0206 |
| 2019/0359300 A1* | 11/2019 | Johnson | ............... | B63B 49/00 |

* cited by examiner

FIG.5 D1>Dt1, D2>Dt2, D3>Dt3, D4>Dt4
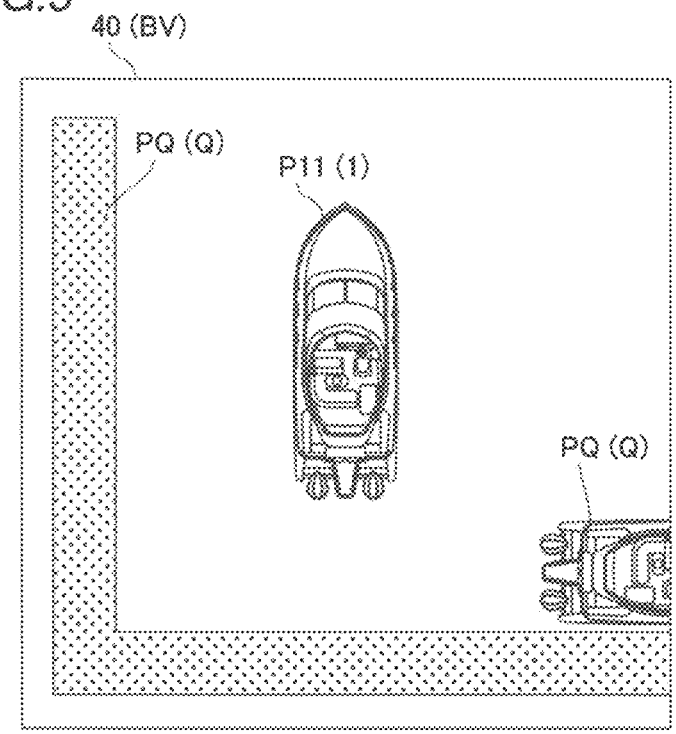
FIG.6 D1>Dt1, D2>Dt2, D3≤Dt3, D4>Dt4
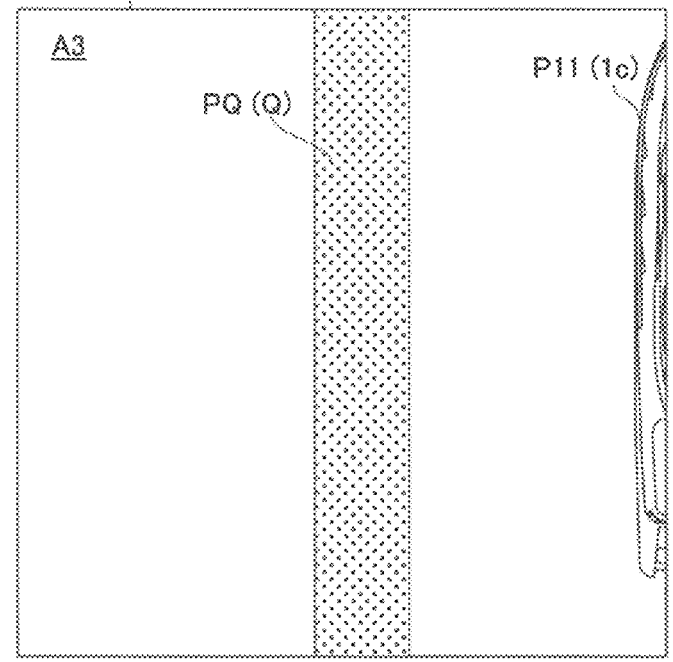

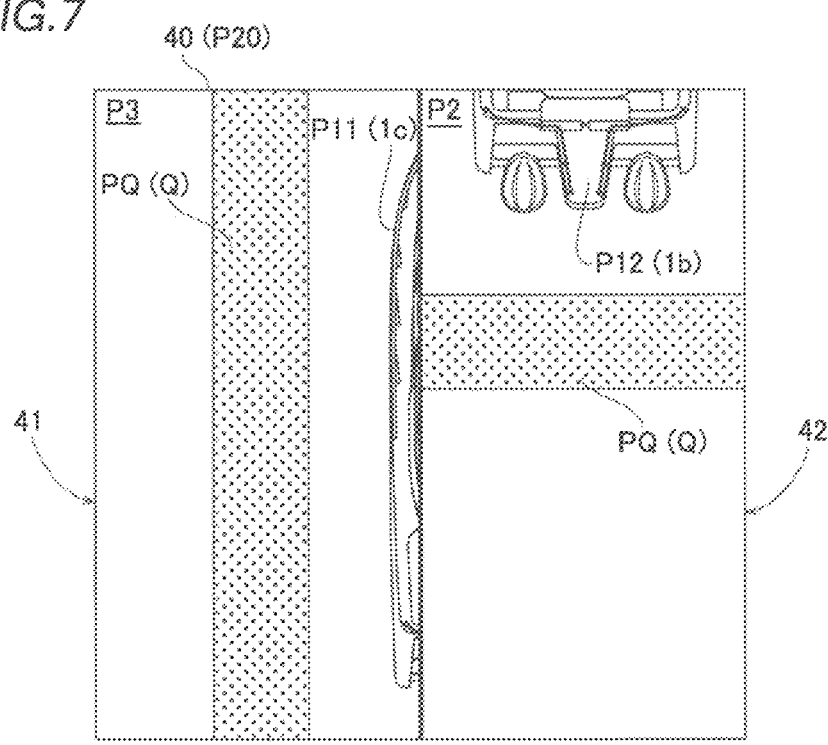

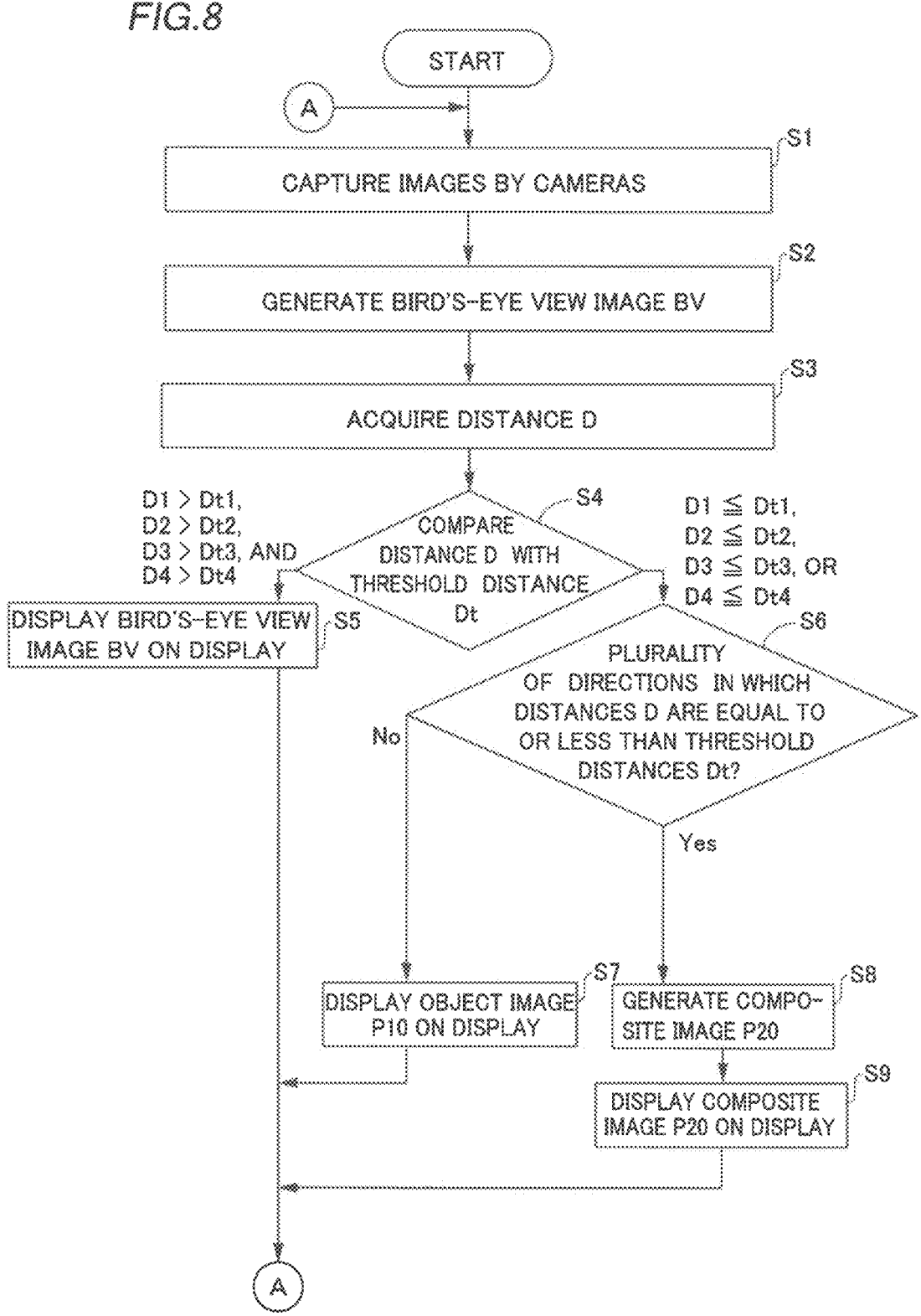

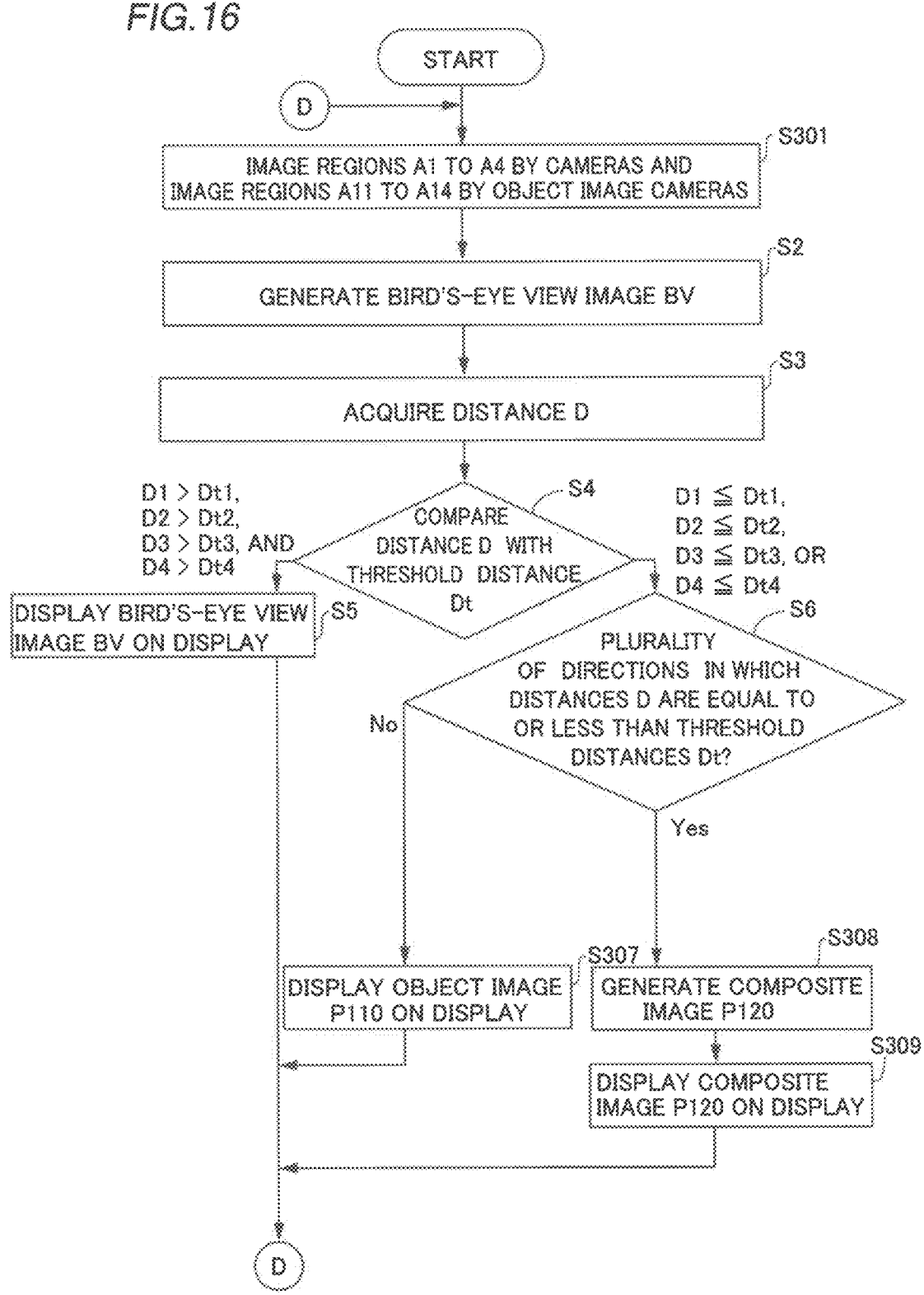

MARINE VESSEL DISPLAY DEVICE, MARINE VESSEL, AND IMAGE DISPLAY METHOD FOR MARINE VESSEL

CROSS REFERENCE TO RELATED APPLICATIONS

This application claims the benefit of priority to Japanese Patent Application No. 2019-051654 filed on Mar. 19, 2019. The entire contents of this application are hereby incorporated herein by reference.

BACKGROUND OF THE INVENTION

1. Field of the Invention

The present invention relates to a marine vessel display device, a marine vessel, and an image display method for a marine vessel.

2. Description of the Related Art

A display device including a display that displays a bird's-eye view image is known in general. Such a marine vessel display device is disclosed in Japanese Patent Laid-Open No. 2010-93605, for example.

Japanese Patent Laid-Open No. 2010-93605 discloses a maneuvering assisting apparatus including a display device that displays an all-around bird's-eye view image. The maneuvering assisting apparatus includes a plurality of cameras and an image processing circuit. The plurality of cameras are located on a side surface of a hull in a downward posture, and image surroundings of the marine vessel. The image processing circuit generates the all-around bird's-eye view image that shows the surroundings of the marine vessel in a bird's-eye view based on images captured by the plurality of cameras. The image processing circuit performs a process of transparently combining a graphic image that represents at least the extension of the aerially viewed marine vessel and the all-around bird's-eye view image. The display device displays a marine vessel-maneuvering assisting image obtained by combining the graphic image and the all-around bird's-eye view image.

Although not disclosed in Japanese Patent Laid-Open No. 2010-93605, when a marine vessel operator attempts to dock the marine vessel, the maneuvering assisting apparatus disclosed in Japanese Patent Laid-Open No. 2010-93605 is conceivably used. That is, the marine vessel operator conceivably moves the marine vessel toward an object (shore) while visually recognizing the all-around bird's-eye view image displayed on the display device disclosed in Japanese Patent Laid-Open No. 2010-93605. In such a case, the all-around bird's-eye view image is obtained by imaging the entire circumference around the marine vessel, and thus an image of the object is conceivably displayed relatively small on the display device. Therefore, in order to improve the visibility of the image of the object, it is conceivable to display the all-around bird's-eye view image on a relatively large-sized display device. However, it may not be easy to dispose a relatively large-sized display device in a location in which its dimensions are limited in the vicinity of an operation seat. Therefore, a display device that improves the visibility of an image of an object while significantly reducing or preventing an increase in the size of the display device is desired.

SUMMARY OF THE INVENTION

Preferred embodiments of the present invention provide marine vessel display devices, marine vessels, and image display methods for marine vessels that each improve the visibility of images of objects while significantly reducing or preventing increases in the sizes of the display devices.

A marine vessel display device according to a preferred embodiment of the present invention includes an imager that images surroundings of a vessel body, an image processor that generates a bird's-eye view image based on images captured by the imager, a display provided in the vessel body and that displays the bird's-eye view image, and a controller configured or programmed to perform a control to switch an image displayed on the display from the bird's-eye view image to an object image obtained by imaging in a direction toward an object located outside the vessel body from the vessel body based on object information that is at least one of information indicating that a distance between the vessel body and the object has become equal to or less than a predetermined distance, and information indicating that the object has been detected.

In a marine vessel display device according to a preferred embodiment of the present invention, the controller is configured or programmed to perform a control to switch the image displayed on the display from the bird's-eye view image to the object image obtained by imaging in the direction toward the object from the vessel body based on the object information that is at least one of the information indicating that the distance between the vessel body and the object has become equal to or less than the predetermined distance and the information indicating that the object has been detected. The bird's-eye view image is obtained by imaging the entire circumference around the vessel body, and thus an image obtained by imaging the object is conceivably displayed relatively small on the display. On the other hand, according to preferred embodiments of the present invention, even when the bird's-eye view image is displayed on the display, the bird's-eye view image on the display is switched to the object image when a marine vessel approaches the object. Therefore, the object image, which is larger than the image of the object in the bird's-eye view image, is automatically displayed on the display without increasing the size of the display. Consequently, the visibility of the object image is improved for a marine vessel operator while an increase in the size of the display device is significantly reduced or prevented.

In a marine vessel display device according to a preferred embodiment of the present invention, the imager preferably images a side of the vessel body in a docking direction and surroundings of the side in the docking direction, and the object image preferably includes an image of the side in the docking direction and the surroundings of the side in the docking direction. Accordingly, the visibility of the object image including the image of the side of the vessel body in the docking direction and the surroundings of the side in the docking direction is improved for the marine vessel operator who attempts to dock the marine vessel. Consequently, the marine vessel operation of the marine vessel operator at the time of docking is effectively supported.

In a marine vessel display device according to a preferred embodiment of the present invention, the imager preferably captures images respectively corresponding to a plurality of directions outward from the vessel body, and the controller is preferably configured or programmed to perform a control to switch the image displayed on the display from the bird's-eye view image to the object image, which is an image corresponding to a direction in which the distance between the vessel body and the object is equal to or less than the predetermined distance among the images respectively corresponding to the plurality of directions or an image corresponding to a direction in which the object has been detected among the images respectively corresponding to the plurality of directions, based on the object information. Accordingly, even when the marine vessel approaches the object in any of the plurality of directions, the bird's-eye view image is switched to an appropriate object image.

In such a case, the controller is preferably configured or programmed to, when there are a plurality of directions in which the distance between the vessel body and the object is equal to or less than the predetermined distance or there are a plurality of directions in which the object has been detected, perform a control to switch the image displayed on the display from the bird's-eye view image to the object image corresponding to each of the plurality of directions, and the display preferably displays, on a same screen, the object image corresponding to each of the plurality of directions. Accordingly, even when the marine vessel approaches the object located in each of the plurality of directions simultaneously or sequentially, the image of the object located in each of the plurality of directions is displayed on the same screen. Consequently, even when the marine vessel approaches the object located in each of the plurality of directions, the visibility of images of a plurality of objects is improved.

In a marine vessel display device according to a preferred embodiment of the present invention, the imager preferably includes a bird's-eye view image imager that captures images of the vessel body and the surroundings of the vessel body to generate the bird's-eye view image, the bird's-eye view image imager defining and functioning as an object image imager that images the object image, and the image processor preferably generates the bird's-eye view image based on the images of the vessel body and the surroundings of the vessel body captured by the imager, and generates the object image based on some of the images of the vessel body and the surroundings of the vessel body captured by the imager and the object information. Accordingly, it is not necessary to provide a dedicated object image imager, and thus an increase in the number of components of the display device for the marine vessel is significantly reduced or prevented.

In a marine vessel display device according to a preferred embodiment of the present invention, the imager preferably includes a bird's eye view image imager that captures images of the vessel body and the surroundings of the vessel body to generate the bird's eye view image, the marine vessel display device preferably further includes an object image imager that captures the object image, the bird's eye view image imager and the object image imager are preferably separate from each other, the image processor preferably generates the bird's-eye view image based on the images of the vessel body and the surroundings of the vessel body captured by the bird's-eye view image imager, and the controller is preferably configured or programmed to perform a control to switch the image displayed on the display from the bird's-eye view image to the object image captured by the object image imager based on the object information. Accordingly, the object image imager suitable for imaging the object is configured separately from the bird's-eye view image imager. Consequently, a more appropriate object image captured by the object image imager is visually recognized by the marine vessel operator.

A marine vessel display device according to a preferred embodiment of the present invention preferably further includes a distance detector that detects the distance between the vessel body and the object, and the controller is preferably configured or programmed to perform a control to switch the image displayed on the display from the bird's-eye view image to the object image based on the distance between the vessel body and the object detected by the distance detector becoming equal to or less than the predetermined distance. Accordingly, the distance between the vessel body and the object is easily detected by the distance detector. Consequently, the controller is configured or programmed to easily perform a control to switch the image displayed on the display from the bird's-eye view image to the object image based on the detection result by the distance detector.

In a marine vessel display device according to a preferred embodiment of the present invention, the controller is preferably configured or programmed to acquire the distance between the vessel body and the object based on an image of the object in the images captured by the imager, and to perform a control to switch the image displayed on the display from the bird's-eye view image to the object image based on the distance between the vessel body and the object that has been acquired becoming equal to or less than the predetermined distance. Accordingly, the distance between the vessel body and the object is acquired by the controller without providing a distance detector. Consequently, an increase in the types of components of the display device for the marine vessel is significantly reduced or prevented.

In a marine vessel display device according to a preferred embodiment of the present invention, the controller is preferably configured or programmed to perform a control to switch the image displayed on the display from the bird's-eye view image to the object image when the distance between the vessel body and the object is equal to or less than the predetermined distance, which is equal to or less than a certain ratio of a dimension of the vessel body in a forward-rearward direction or a left-right direction, and the ratio is preferably less than 1. Accordingly, the predetermined distance is set in a state in which the dimension of the vessel body is taken into consideration, and thus the predetermined distance is set to a more appropriate size. Consequently, the bird's-eye view image is switched to the object image at a more appropriate time (timing).

A marine vessel display device according to a preferred embodiment of the present invention preferably further includes a vessel speed detector that detects a vessel speed of the vessel body, and the controller is preferably configured or programmed to perform a control to set the predetermined distance to a larger distance as the vessel speed detected by the vessel speed detector increases. Accordingly, even when the distance between the vessel body and the object decreases relatively quickly due to the relatively high vessel speed, the bird's-eye view image is switched to the object image at an appropriate time.

In a marine vessel display device according to a preferred embodiment of the present invention, the controller is preferably configured or programmed to perform a control to switch the image displayed on the display from the bird's-eye view image to the object image based on an image of the object being detected from the images captured by the imager. Accordingly, the image displayed on the display is switched from the bird's-eye view image to the object image without performing a process of comparing the distance between the vessel body and the object with the predetermined distance.

In a marine vessel display device that performs a control to acquire the distance between the vessel body and the object based on the images captured by the imager or performs a control to switch the image displayed on the display from the bird's-eye view image to the object image based on the image of the object being detected from the images captured by the imager, the image of the object preferably includes a feature point image of a pier or another marine vessel, and the image processor preferably extracts the feature point image of the pier or another marine vessel from the images captured by the imager. Accordingly, the image of the object (the feature point image of the pier or another marine vessel) is easily detected from the captured images, and thus based on the captured images, the distance between the vessel body and the object is easily acquired, or the object is easily detected.

In a marine vessel display device according to a preferred embodiment of the present invention, the display that displays the bird's-eye view image and the object image is preferably located adjacent to or in a vicinity of an operation seat in the vessel body. Accordingly, the marine vessel operator located on the operation seat easily visually recognizes the bird's-eye view image and the object image displayed on the display.

A marine vessel according to a preferred embodiment of the present invention includes a vessel body, an imager that images surroundings of the vessel body, an image processor that generates a bird's eye view image based on images captured by the imager, a display provided in the vessel body and that displays the bird's-eye view image, and a controller configured or programmed to perform a control to switch an image displayed on the display from the bird's-eye view image to an object image obtained by imaging in a direction toward an object located outside the vessel body from the vessel body based on object information that is at least one of information indicating that a distance between the vessel body and the object has become equal to or less than a predetermined distance and information indicating that the object has been detected.

In a marine vessel according to a preferred embodiment of the present invention, similarly to the marine vessel display device according to preferred embodiments of the present invention described above, the visibility of an image obtained by imaging the object is improved while an increase in the size of a display device is significantly reduced or prevented.

An image display method for a marine vessel according to a preferred embodiment of the present invention includes imaging surroundings of a vessel body, generating a bird's eye view image based on images of the surroundings of the vessel body that have been captured, displaying the bird's eye view image, and switching a displayed image from the bird's-eye view image to an object image obtained by imaging in a direction toward an object located outside the vessel body from the vessel body based on object information that is at least one of information indicating that a distance between the vessel body and the object has become equal to or less than a predetermined distance, and information indicating that the object has been detected.

In an image display method for a marine vessel according to a preferred embodiment of the present invention, similarly to the marine vessel display device according to preferred embodiments of the present invention described above, the visibility of an image obtained by imaging the object is improved while an increase in the size of a display device is significantly reduced or prevented.

In an image display method for a marine vessel according to a preferred embodiment of the present invention, the imaging of the surroundings of the vessel body preferably includes imaging a side of the vessel body in a docking direction and surroundings of the side in the docking direction, and the switching of the displayed image preferably includes switching the displayed image from the bird's-eye view image to the object image including an image of the side in the docking direction and the surroundings of the side in the docking direction based on the object information. Accordingly, the visibility of the object image including the image of the side of the vessel body in the docking direction and the surroundings of the side in the docking direction is improved for the marine vessel operator who attempts to dock the marine vessel. Consequently, the marine vessel operation of the marine vessel operator at the time of docking is effectively supported.

In an image display method for a marine vessel according to a preferred embodiment of the present invention, the imaging of the surroundings of the vessel body preferably includes capturing images respectively corresponding to a plurality of directions outward from the vessel body, and the switching of the displayed image preferably includes switching the displayed image from the bird's-eye view image to the object image, which is an image corresponding to a direction in which the distance between the vessel body and the object is equal to or less than the predetermined distance among the images respectively corresponding to the plurality of directions or an image corresponding to a direction in which the object has been detected among the images respectively corresponding to the plurality of directions, based on the object information. Accordingly, even when the marine vessel approaches the object in any of the plurality of directions, the bird's-eye view image is switched to an appropriate object image.

In such a case, the switching of the displayed image preferably includes switching, when there are a plurality of directions in which the distance between the vessel body and the object is equal to or less than the predetermined distance or there are a plurality of directions in which the object has been detected, the displayed image from the bird's-eye view image to the object image corresponding to each of the plurality of directions and displaying, on a same screen of a display, the object image corresponding to each of the plurality of directions. Accordingly, even when the marine vessel approaches the object located in each of the plurality of directions simultaneously or sequentially, the image of the object located in each of the plurality of directions is displayed on the same screen. Consequently, even when the marine vessel approaches the object located in each of the plurality of directions, the visibility of images of a plurality of objects is improved.

In an image display method for a marine vessel according to a preferred embodiment of the present invention, the imaging of the surroundings of the vessel body preferably includes capturing images of the vessel body and the surroundings of the vessel body to generate the bird's-eye view image and capturing the object image, and the image display method preferably further includes generating the object image based on some of the images of the vessel body and the surroundings of the vessel body that have been captured and the object information. Accordingly, it is not necessary to provide a dedicated imager for capturing the object image in addition to the imager that captures the bird's-eye view image, and thus an increase in the number of components of the display device for the marine vessel is significantly reduced or prevented.

In an image display method for a marine vessel according to a preferred embodiment of the present invention, the imaging of the surroundings of the vessel body preferably includes capturing, by a bird's eye view image imager, images of the vessel body and the surroundings of the vessel body to generate the bird's eye view image and capturing the object image by an object image imager separate from the bird's eye view image imager, the generating of the bird's eye view image preferably includes generating the bird's-eye view image based on the images of the vessel body and the surroundings of the vessel body captured by the bird's-eye view image imager, and the switching of the displayed image preferably includes switching the displayed image from the bird's-eye view image to the object image captured by the object image imager based on the object information. Accordingly, the object image imager suitable for imaging the object captures the object image separately from the bird's-eye view image imager.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is a diagram illustrating a bird's eye view image according to the first preferred embodiment of the present invention.

FIG. 6 is a diagram illustrating an object image according to the first preferred embodiment of the present invention.

FIG. 7 is a diagram illustrating a composite image according to the first preferred embodiment of the present invention.

FIG. 8 is a flowchart illustrating an image display method according to the first preferred embodiment of the present invention.

FIG. 16 is a flowchart illustrating an image display method according to the fourth preferred embodiment of the present invention.

DETAILED DESCRIPTION OF THE PREFERRED EMBODIMENTS

Preferred embodiments of the present invention are hereinafter described with reference to the drawings.

First Preferred Embodiment

The structure of a marine vessel 100 according to a first preferred embodiment of the present invention is now described with reference to FIGS. 1 to 7. The marine vessel 100 is a small marine vessel, for example.

Figure 1:
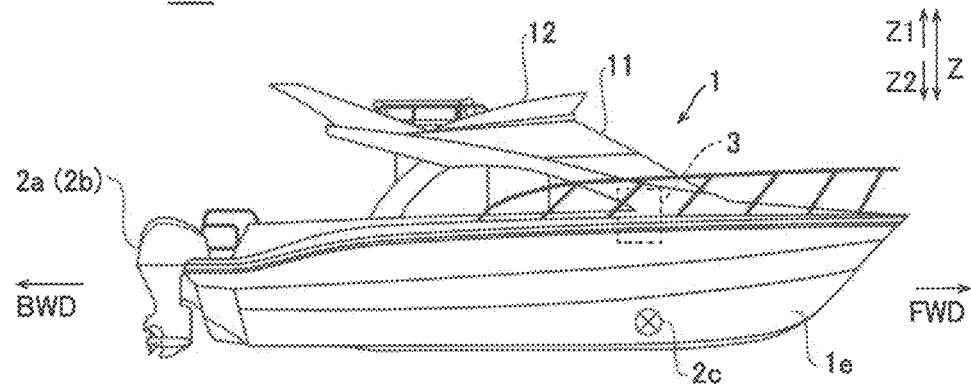
FIG. 1 is a side view showing the structure of a marine vessel according to a first preferred embodiment of the present invention.
Figure 2:
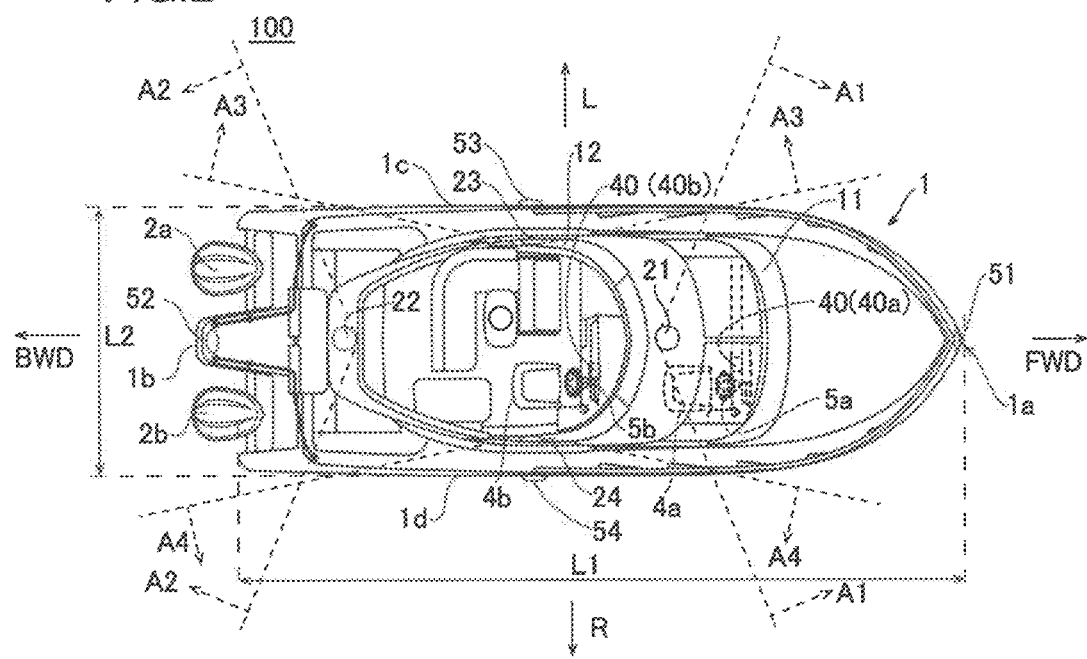
FIG. 2 is a plan view showing the structure of the marine vessel according to the first preferred embodiment of the present invention.

As shown in FIG. 1, the marine vessel 100 includes a vessel body 1, propulsion devices 2a and 2b, a side thruster 2c, and a display device 3. The vessel body 1 includes a cabin 11 at an upper portion thereof and a bridge 12 above the cabin 11. As shown in FIG. 2, an operation seat 4a and a marine vessel operation unit 5a provided adjacent to or in the vicinity of the operation seat 4a are provided inside the cabin 11. An operation seat 4b and a marine vessel operation unit 5b provided adjacent to or in the vicinity of the operation seat 4b are provided in the bridge 12. The operation seat 4a and the operation seat 4b have the same structure. The marine vessel operation unit 5a and the marine vessel operation unit 5b have the same structure.

In the present specification, the term "front (forward)" refers to a direction indicated by "FWD" in the figures and the forward movement direction (the bow 1a side of the vessel body 1) of the marine vessel 100. The term "rear (rearward)" refers to a direction indicated by "BWD" in the figures and the reverse movement direction (the stern 1b side of the vessel body 1) of the marine vessel 100. Furthermore, the term "left (leftward)" refers to a direction indicated by "L" in the figures and the port 1c side of the vessel body 1. The term "right (rightward)" refers to a direction indicated by "R" in the figures and the starboard 1d side of the vessel body 1. The term "vertically" refers to a direction indicated by "Z" in FIG. 1. The term "upper (above)" refers to a direction indicated by "Z1" in FIG. 1, and the term "lower (downward)" refers to a direction indicated by "Z2" in FIG. 1.

The propulsion devices 2a and 2b are outboard motors, for example. As shown in FIG. 2, the propulsion device 2a is attached to a left portion of the stern 1b. The propulsion device 2b is attached to a right portion of the stern 1b. The side thruster 2c is attached to a vertically lower portion (see FIG. 1) of a hull 1e of the vessel body 1, for example. The marine vessel 100 is movable in forward, rearward, leftward, and rightward directions by the propulsion forces of the propulsion devices 2a and 2b and the side thruster 2c.

The marine vessel operation units 5a and 5b each include a steering operator, a remote control, and a joystick, for example. The marine vessel operation units 5a and 5b change the orientations and propulsion forces of the propulsion devices 2a and 2b and change the propulsion force generation direction and propulsion force of the side thruster 2c based on operations performed by a marine vessel operator.

The display device 3 supports the marine vessel operation of the marine vessel operator, for example. That is, the display device 3 displays an image on a display 40a (40b) (see FIG. 2) when the marine vessel operator operates the marine vessel operation unit 5a (5b) (operates the marine vessel) while being located on the operation seat 4a (4b) to complement the marine vessel operator's field of view (blind spot).

Figure 3:
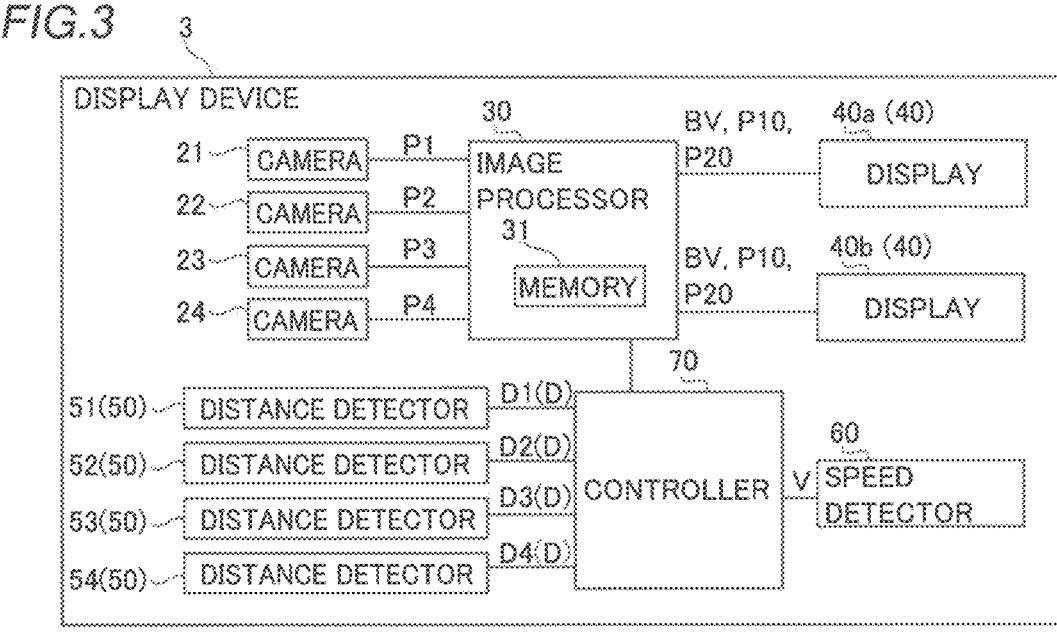
FIG. 3 is a block diagram showing the structure of a display device according to the first preferred embodiment of the present invention.

As shown in FIG. 3, the display device 3 includes cameras 21, 22, 23, and 24, an image processor 30, displays 40a and 40b, distance detectors 51, 52, 53, and 54, a speed detector 60, and a controller 70. The displays 40a and 40b have the same structure, and in the following description, the displays 40a and 40b are described as a "display 40" unless these features are particularly different from each other.

The cameras 21, 22, 23, and 24 image surroundings of the vessel body 1. The cameras 21 to 24 are examples of an "imager", a "bird's-eye view image imager", and an "object image imager".

As shown in FIG. 2, the camera 21 is located at a front portion of the vessel body 1. The camera 21 images a portion of the bow 1a of the vessel body 1 and a region A1 forward of the vessel body 1. The camera 22 is located at a rear portion of the vessel body 1. The camera 22 images a portion of the stern 1b of the vessel body 1 and a region A2 rearward of the vessel body 1. The camera 23 is located at a left portion of the vessel body 1. The camera 23 images a portion of the port 1c side of the vessel body 1 and a region A3 leftward of the vessel body 1. The camera 24 is located at a right portion of the vessel body 1. The camera 24 images a portion of the starboard 1d side of the vessel body 1 and a region A4 rightward of the vessel body 1. That is, images (P1 to P4) respectively corresponding to four directions outward from the vessel body 1 are captured by the cameras 21, 22, 23, and 24. Although FIG. 2 shows that the regions A1 to A4 partially overlap each other as viewed from above the marine vessel 100, the imaging ranges of the cameras 21 to 24 may be set in such a manner that the regions A1 to A4 do not overlap each other.

Figure 4:
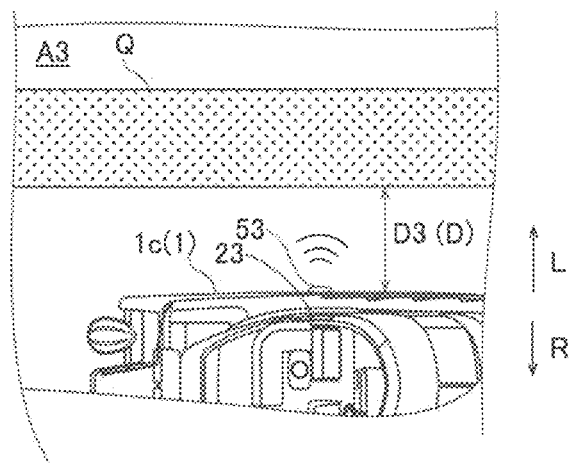
FIG. 4 is a diagram illustrating the state of the marine vessel at the time of docking a port side of the marine vessel according to the first preferred embodiment of the present invention.

As shown in FIG. 4, when the marine vessel 100 reaches a shore on the port 1c side of the vessel body 1, the camera 23 images the port 1c side in a shore direction and an object Q in the region A3 around the port 1c side. When the marine vessel 100 reaches a shore on the starboard 1d side of the vessel body 1, the camera 24 images the starboard 1d side in the shore direction and the object Q around the starboard 1d side, similarly to the case in which the marine vessel 100 reaches the shore on the port 1c side. The object Q is a pier, a quay, or another marine vessel, for example.

The cameras 21, 22, 23, and 24 capture images of the vessel body 1 and the surroundings of the vessel body 1 so as to generate a bird's-eye view image BV, as shown in FIG. 5, and capture images P1 to P4 (object image P10), as shown in FIG. 6. That is, in the first preferred embodiment, the cameras 21, 22, 23, and 24 are imagers (bird's-eye view image imagers) that image the bird's-eye view image BV, and are also imagers (object image imagers) that capture the object image P10.

As shown in FIG. 3, the image processor 30 acquires the image P1 captured by the camera 21, the image P2 captured by the camera 22, the image P3 captured by the camera 23, and the image P4 captured by the camera 24. The image processor 30 includes a memory 31. The image processor 30 stores the acquired images P1 to P4 in the memory 31.

The image processor 30 generates the bird's-eye view image BV by combining the images P1 to P4. The bird's-eye view image BV shows the entire circumference around the vessel body 1 in such a manner as to virtually look down from above the marine vessel 100, and is obtained by combining the images P1 to P4. The image processor 30 stores the generated bird's-eye view image BV in the memory 31. Furthermore, the image processor 30 outputs an image based on a command from the controller 70 to the display 40 from among the images P1 to P4 (object image P10) and the bird's-eye view image BV stored in the memory 31. In other words, in the first preferred embodiment, the image processor 30 generates the bird's-eye view image BV based on the images P1 to P4, and generates the object image P10 based on the images P1 to P4 and a command from the controller 70 based on object information E described below.

The display 40 is a liquid crystal display or an organic EL display, for example. The display 40a (40b) is located adjacent to or in the vicinity of the operation seat 4a (4b) and the marine vessel operation unit 5a (5b) and in front of the operation seat 4a (4b). In other words, the display 40a (40b) is provided at a position visually recognized by the marine vessel operator who is located on the operation seat 4a (4b) and is operating the boat operation unit 5a (5b). The displays 40a and 40b display the images (the bird's-eye view image BV and the object image P10) output from the image processor 30.

The distance detectors 51 to 54 each include a sound navigation and ranging (SONAR), a light detection and ranging (LIDER), or a radio detection and ranging (RADAR), for example. For example, as shown in FIG. 4, the distance detector 53 detects a distance D3 from the vessel body 1 (distance detector 53) to the object Q located leftward.

The distance detector 51 detects a distance D1 from the vessel body 1 (distance detector 51) to the object Q located forward. The distance detector 52 detects a distance D2 from the vessel body 1 (distance detector 52) to the object Q located rearward. The distance detector 54 detects a distance D4 from the vessel body 1 (distance detector 54) to the object Q located rightward. As shown in FIG. 3, the distance detectors 51 to 54 transmit information (signals) about the detected distances (D1 to D4) to the controller 70, respectively. In the following description, unless the distances D1 to D4 are different from each other, these are simply described as a "distance D", and unless the distance detectors 51 to 54 are different from each other, these are simply described as a "distance detector 50".

The speed detector 60 detects a vessel speed V that is the ground speed of the marine vessel 100. The speed detector 60 transmits information about the vessel speed V to the controller 70. The speed detector 60 includes a global positioning system (GPS), for example. Furthermore, the speed detector 60 detects an engine speed, a turning angular speed, a wind direction, a wind speed, and a tidal current speed, for example. The speed detector 60 is an example of a "vessel speed detector".

The controller 70 includes a control processing circuit including a central processing unit (CPU) and a memory, for example. As shown in FIGS. 5 and 6, the controller 70 is configured or programmed to perform a control to switch an image displayed on the display 40 from the bird's-eye view image BV to the object image P10 based on the object information E. In other words, the controller 70 is configured or programmed to perform a control to switch an image output to the display 40 by the image processor 30 from the bird's-eye view image BV to the object image P10 based on the object information E. The object information E indicates that the distance D between the vessel body 1 and the object Q located outside the vessel body 1 is equal to or less than a threshold distance Dt.

The threshold distance Dt includes threshold distances Dt1, Dt2, Dt3, and Dt4. In the first preferred embodiment, the controller 70 is configured or programmed to perform a control to set the threshold distance Dt to a larger distance as the vessel speed V detected by the speed detector 60 increases. That is, the controller 70 is configured or programmed to perform a control to set the threshold distance Dt to a smaller distance as the vessel speed V detected by the speed detector 60 decreases. Furthermore, the controller 70 is configured or programmed to perform a control to correct the threshold distance Dt based on the engine speed, the turning angular speed, the wind direction, the wind speed, and the tidal current speed detected by the speed detector 60.

The threshold distances Dt1 and Dt2 are set to be equal to or less than a predetermined ratio r1 of the length L1 (dimension) of the vessel body 1 (see FIG. 2) in a forward-rearward direction. The predetermined ratio r1 is less than 1, for example. The threshold distances Dt3 and Dt4 are set to be equal to or less than a predetermined ratio r2 of the length L2 (dimension) of the vessel body 1 (see FIG. 2) in a left-right direction.

The controller 70 is configured or programmed to perform a process of comparing the distance D1 with the threshold distance Dt1, to perform a process of comparing the distance D2 with the threshold distance Dt2, to perform a process of comparing the distance D3 with the threshold distance Dt3, and to perform a process of comparing the distance D4 with the threshold distance Dt4.

As shown in FIG. 5, the controller 70 is configured or programmed to control the display 40 to display the bird's-eye view image BV when the distance D1 is larger than the threshold distance Dt1, the distance D2 is larger than the threshold distance Dt2, the distance D3 is larger than the threshold distance Dt3, and the distance D4 is larger than the threshold distance Dt4. The bird's-eye view image BV includes an image P11 of the vessel body 1 and an image PQ of the object Q (a pier and another marine vessel in FIG. 5), for example.

As shown in FIG. 6, the controller 70 is configured or programmed to perform a control to switch the image displayed on the display 40 from the bird's-eye view image BV to the object image P10 corresponding to a direction in which the distance D is equal to or less than the threshold distance Dt when the distance D1 is equal to or less than the threshold distance Dt1, the distance D2 is equal to or less than the threshold distance Dt2, the distance D3 is equal to or less than the threshold distance Dt3, or the distance D4 is equal to or less than the threshold distance Dt4. FIG. 6 shows the object image P10 in which the distance D3 is equal to or less than the threshold distance Dt3.

Specifically, the object image P10 includes an image P3 of one of the port 1c side and the starboard 1d side in a docking direction and the region A3 around one in the docking direction, or an image P4 of the other of the port 1c side and the starboard 1d side in the docking direction and the region A4 around the other in the docking direction. For example, as shown in FIG. 6, the controller 70 is configured or programmed to perform a control to switch the image displayed on the display 40 from the bird's-eye view image BV to the object image P10 including the image PQ of the pier, which is the object Q, based on the distance D3 becoming equal to or less than the threshold distance Dt3 when the marine vessel 100 attempts to approach the pier, which is the object Q located leftward of the vessel body 1. In such a case, the object image P10 is the image P3. The image P3 includes the image P11 of the port 1c side.

As shown in FIG. 7, in the first preferred embodiment, the controller 70 is configured or programmed to perform a control to switch the image displayed on the display 40 from the bird's-eye view image BV to the object image P10 corresponding to each of distances D that are equal to or less than threshold distances Dt when there are a plurality of distances D (directions) that are equal to or less than the corresponding threshold distances Dt. Specifically, the display 40 displays, on the same screen, the object image P10 corresponding to each of the distances D that are equal to or less than the threshold distances Dt.

For example, as shown in FIG. 5, an example is described in which the pier, which is the object Q having an L-shape, approaches the left side of the marine vessel 100, and thereafter the object Q approaches the rear side of the marine vessel 100 as viewed from vertically above. In such a case, the controller 70 is configured or programmed to perform a control to switch the image displayed on the display 40 from the bird's-eye view image BV to the object image P10 (P3) including the image PQ of the object Q, as shown in FIG. 6, based on the distance D3 becoming equal to or less than the threshold distance Dt3.

Thereafter, the controller 70 is configured or programmed to switch the image displayed on the display 40 from the object image P10 to a composite image P20 in which the images P2 and P3 have been combined, as shown in FIG. 7, based on the distance D3 become equal to or less than the threshold distance Dt3, and the distance D2 has become equal to or less than the threshold distance Dt2. For example, the image processor 30 combines the image P2 and the image P3 to generate the composite image P20, and outputs the composite image P20 to the display 40 based on a command from the controller 70. For example, the composite image P20 shows the image P3 (an image including the image of the object Q and the image P11 of the port 1c) displayed on a left portion 41 of the display 40 and the image P2 (an image including the image of the object Q and an image P12 of the stern 1b) displayed on a right portion 42 of the display 40.

An image display method of the display device 3 of the marine vessel 100 according to the first preferred embodiment is now described. A control process by the display device 3 is executed by the controller 70. FIG. 8 shows a process flow relating to the image display method.

In step S1, the region A1 around the vessel body 1 is imaged by the camera 21, the region A2 around the vessel body 1 is imaged by the camera 22, the region A3 around the vessel body 1 is imaged by the camera 23, and the region A4 around the vessel body 1 is imaged by the camera 24. That is, the images P1 to P4 respectively corresponding to a plurality of directions outward from the vessel body 1 are captured. When the port 1c side or the starboard 1d side of the marine vessel 100 is docked, among a portion of the port 1c side of the vessel body 1 and the region A3 around the port 1c side and a portion of the starboard 1d side of the vessel body 1 and the region A4 around the starboard 1d side, a side and a region in the docking direction are imaged.

In this step, the images P1 to A4 of the vessel body 1 and the regions A1 to A4 around the vessel body 1 are captured to generate the bird's-eye view image BV, and the object image P10 is captured.

In step S2, the bird's-eye view image BV is generated by the image processor 30. Specifically, the bird's-eye view image BV is generated based on the images P1 to P4 captured in step S1. Thereafter, the process advances to step S3.

In step S3, the distance D is acquired. Specifically, the distances D1 to D4 are detected by the distance detector 50. Thereafter, the process advances to step S4.

In step S4, the distance D is compared with the threshold distance Dt. That is, the distance D1 is compared with the threshold distance Dt1, the distance D2 is compared with the threshold distance Dt2, the distance D3 is compared with the threshold distance Dt3, and the distance D4 is compared with the threshold distance Dt4. The controller 70 advances to step S5 when the distance D1 is larger than the threshold distance Dt1, the distance D2 is larger than the threshold distance Dt2, the distance D3 is larger than the threshold distance Dt3, and the distance D4 is larger than the threshold distance Dt4. The controller 70 advances to step S6 when the distance D1 is equal to or less than the threshold distance Dt1, the distance D2 is equal to or less than the threshold distance Dt2, the distance D3 is equal to or less than the threshold distance Dt3, or the distance D4 is equal to or less than the threshold distance Dt4.

In step S5, the bird's-eye view image BV is displayed on the display 40. Then, the process returns to step S1. That is, the bird's-eye view image BV is displayed on the display 40 until the distance D becomes equal to or less than the threshold distance Dt.

In step S6, it is determined whether or not there are a plurality of distances D (directions) that are equal to or less than the corresponding threshold distances Dt. When there are not a plurality of distances D that are equal to or less than the corresponding threshold distances Dt (there is one), the process advances to step S7. When there are a plurality of distances D that are equal to or less than the corresponding threshold distances Dt, the process advances to step S8.

In step S7, the object image P10 corresponding to the distance D (direction) that is equal to or smaller than the threshold distance Dt is displayed on the display 40. Then, the process returns to step S1. That is, in step S7, the image displayed on the display 40 is switched from the bird's-eye view image BV to the object image P10 obtained by imaging in a direction toward the object Q from the vessel body 1 based on the distance D becoming equal to or less than the threshold distance Dt (object information E). When the port 1c side or the starboard 1d side of the marine vessel 100 is docked, the image displayed on the display 40 is switched from the bird's-eye view image BV to the object image P10 including the image (P3 or P4) including the side in the docking direction among the port 1c side and the starboard 1d side and the region in the docking direction among the region A3 and the region A4.

That is, the image displayed on the display 40 is switched from the bird's-eye view image BV to the object image P10, which is an image corresponding to a direction in which the distance D is equal to or less than the threshold distance Dt among the images P1 to P4 respectively corresponding to the plurality of directions, based on the object information E.

In step S8, the composite image P20 is generated. That is, the composite image P20 in which the object images P10 corresponding to the distances D (directions) that are equal to or less than the threshold distances Dt have been combined is generated. Thereafter, the process advances to step S9.

In step S9, the composite image P20 is displayed on the display 40. That is, when there are a plurality of directions in which the distances D are equal to or less than the threshold distances Dt, the image displayed on the display 40 is switched from the bird's-eye view image BV to a plurality of object images P10 corresponding to the directions in which the distances D are equal to or less than the threshold distances Dt, and the plurality of object images P10 are displayed on the same screen of the display 40. Then, the process returns to step S1.

According to the first preferred embodiment of the present invention, the following advantageous effects are achieved.

According to the first preferred embodiment of the present invention, the controller 70 is configured or programmed to perform a control to switch the image displayed on the display 40 from the bird's-eye view image BV to the object image P10 obtained by imaging in the direction toward the object Q from the vessel body 1 based on the object information E indicating that the distance D has become equal to or less than the threshold distance Dt. Accordingly, even when the bird's-eye view image BV is displayed on the display 40, the bird's-eye view image BV on the display 40 is switched to the object image P10 when the marine vessel 100 approaches the object Q. Therefore, the object image P10, which is larger than the image of the object Q in the bird's-eye view image BV, is automatically displayed on the display 40 without increasing the size of the display 40. Consequently, the visibility of the object image P10 is improved for the marine vessel operator who desires to bring the marine vessel 100 closer to the object Q while an increase in the size of the display device 3 is significantly reduced or prevented.

According to the first preferred embodiment of the present invention, the cameras 21 to 24 image the side in the docking direction among the port 1c side and the starboard 1d side of the vessel body 1 and the region in the docking direction among the regions A3 and A4. Furthermore, the object image P10 includes the image of the side in the docking direction among the port 1c side and the starboard 1d side of the vessel body 1 and the region in the docking direction among the regions A3 and A4. Accordingly, the visibility of the object image P10 including the image of the side in the docking direction among the port 1c side and the starboard 1d side of the vessel body 1 and the region in the docking direction among the regions A3 and A4 is improved for the marine vessel operator who attempts to dock the marine vessel 100. Consequently, the marine vessel operation of the marine vessel operator at the time of docking is effectively supported.

According to the first preferred embodiment of the present invention, the cameras 21 to 24 capture the images P1 to P4 respectively corresponding to the plurality of directions outward from the vessel body 1. Furthermore, the controller 70 is configured or programmed to perform a control to switch the image displayed on the display 40 from the bird's-eye view image BV to the object image P10, which is the image corresponding to the direction in which the distance D is equal to or less than the threshold distance Dt among the images respectively corresponding to the plurality of directions, based on the object information E. Accordingly, even when the marine vessel 100 approaches the object Q in any of the plurality of directions, the bird's-eye view image BV is switched to an appropriate object image P10.

According to the first preferred embodiment of the present invention, the controller 70 is configured or programmed to perform a control to switch the image displayed on the display 40 from the bird's-eye view image BV to the object image P10 corresponding to each of the plurality of directions when there are the plurality of directions in which the distances D are equal to or less than the threshold distances Dt. Furthermore, the display 40 displays, on the same screen, the object image P10 corresponding to each of the plurality of directions. Accordingly, even when the marine vessel 100 approaches the object Q located in each of the plurality of directions simultaneously or sequentially, the image of the object Q located in each of the plurality of directions is displayed on the same screen of the display 40. Consequently, even when the marine vessel 100 approaches the object Q located in each of the plurality of directions, the visibility of images PQ of a plurality of objects is improved.

According to the first preferred embodiment of the present invention, the cameras 21 to 24 capture the images of the vessel body 1 and the surroundings of the vessel body 1 to generate the bird's-eye view image BV, and capture the object image P10. Furthermore, the image processor 30 generates the bird's-eye view image BV based on the images of the vessel body 1 and the surroundings of the vessel body 1 captured by the cameras 21 to 24, and generates the object image P10 based on some of the images of the vessel body 1 and the surroundings of the vessel body 1 captured by the cameras 21 to 24 and the object information E. Accordingly, it is not necessary to provide a dedicated object image imager, and thus an increase in the number of components of the display device 3 for the marine vessel 100 is significantly reduced or prevented.

According to the first preferred embodiment of the present invention, the display device 3 further includes the distance detector 50 that detects the distance D, and the controller 70 is configured or programmed to perform a control to switch the image displayed on the display 40 from the bird's-eye view image BV to the object image P10 based on the distance D detected by the distance detector 50 becoming equal to or less than the threshold distance Dt. Accordingly, the distance D is easily detected by the distance detector 50. Consequently, the controller 70 is configured or programmed to easily perform a control to switch the image displayed on the display 40 from the bird's-eye view image BV to the object image P10 based on the detection result by the distance detector 50.

According to the first preferred embodiment of the present invention, the controller 70 is configured or programmed to perform a control to switch the image displayed on the display 40 from the bird's-eye view image BV to the object image P10 when the distance D1 (D2) is equal to or less than the threshold distance Dt1 (Dt2), which is equal to or less than the ratio r1 of the dimension L1 of the vessel body 1 in the forward-rearward direction. Furthermore, the controller 70 is configured or programmed to perform a control to switch the image displayed on the display 40 from the bird's-eye view image BV to the object image P10 when the distance D3 (D4) is equal to or less than the threshold distance Dt3 (Dt4), which is equal to or less than the ratio r2 of the dimension L2 of the vessel body 1 in the left-right direction. The ratio r1 (r2) is less than 1. Accordingly, the threshold distance Dt is set in a state in which the dimension L1 (L2) of the vessel body 1 is taken into consideration, and thus the threshold distance Dt is set to a more appropriate size. Consequently, the bird's-eye view image BV is switched to the object image P10 at a more appropriate time (timing).

According to the first preferred embodiment of the present invention, the marine vessel 100 includes the speed detector 60 that detects the vessel speed V of the vessel body 1. Furthermore, the controller 70 is configured or programmed to perform a control to set the threshold distance Dt to a larger distance as the vessel speed V detected by the speed detector 60 increases. Accordingly, even when the distance D decreases relatively quickly due to the relatively high vessel speed V, the bird's-eye view image BV is switched to the object image P10 at an appropriate time.

Second Preferred Embodiment

The structure of a marine vessel 200 according to a second preferred embodiment of the present invention is now described with reference to FIGS. 9 and 10. In the second preferred embodiment, a distance D is acquired based on images P1 to P4 captured by cameras 21 to 24, unlike the first preferred embodiment in which the distance D between the vessel body 1 and the object Q is detected by the distance detector 50. In the second preferred embodiment, the same or similar structures as those of the first preferred embodiment are denoted by the same reference numerals, and description thereof is omitted.

Figure 9:
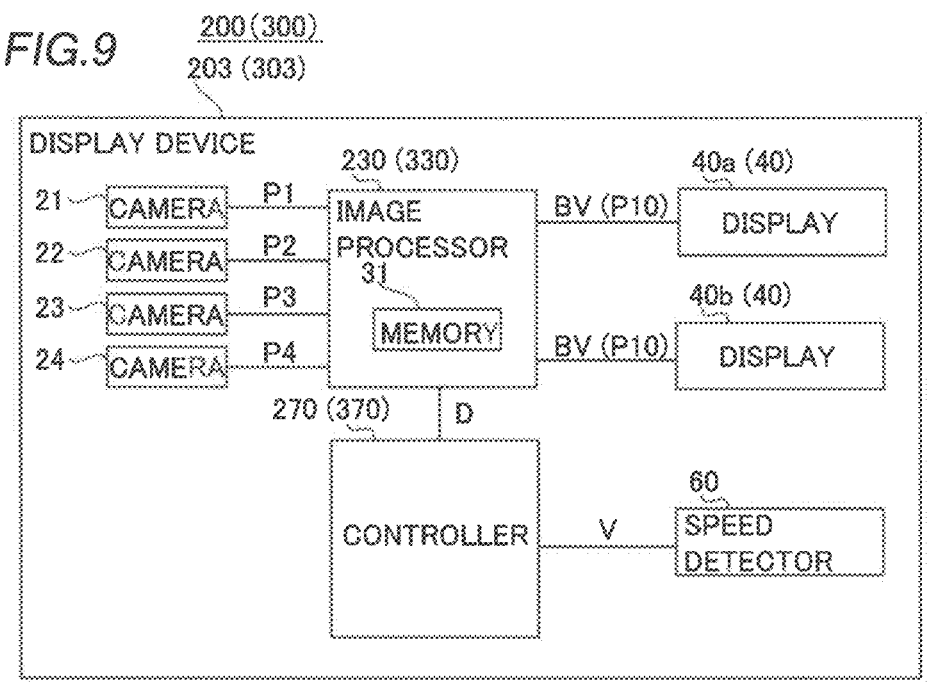
FIG. 9 is a block diagram showing the structure of a display device according to second and third preferred embodiments of the present invention.
Figure 10:
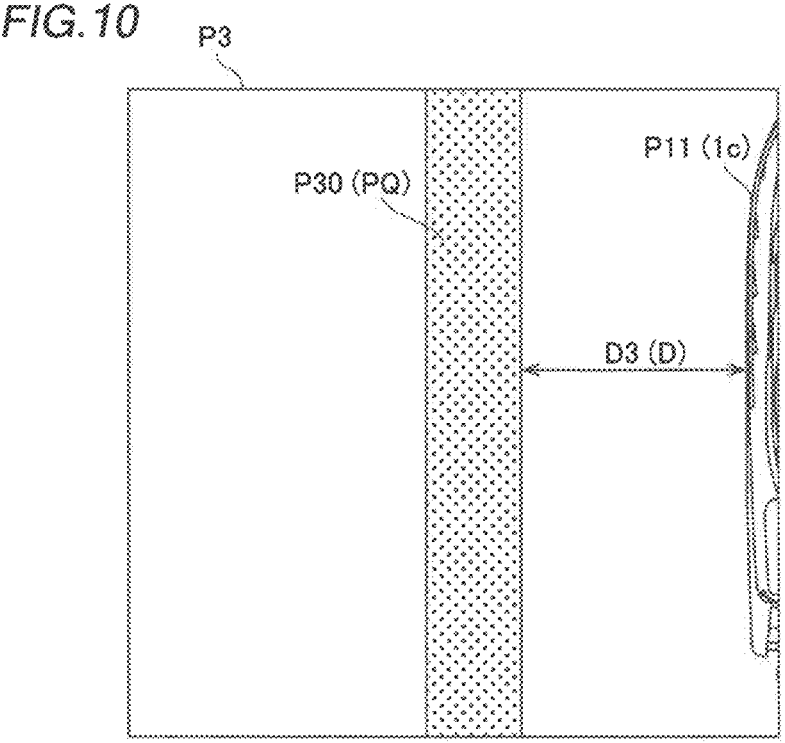
FIG. 10 is a diagram illustrating distance acquisition according to the second preferred embodiment of the present invention.

In the second preferred embodiment, as shown in FIGS. 9 and 10, the marine vessel 200 includes a display device 203. The display device 203 includes an image processor 230 and a controller 270. As shown in FIG. 10, the image processor 230 performs a process of extracting an image (feature point image P30) of an object Q from the images P1 to P4 captured by the cameras 21 to 24.

For example, the image processor 230 extracts the feature point image P30 in the images P1 to P4 by comparing (pattern-matching, for example) the feature point image P30 of a pier or another marine vessel stored in advance in a memory 31 with each of the images P1 to P4. The images P1 to P4 include an image P11 of a vessel body 1. Although FIG. 10 shows an example in which an image of the pier is set as the feature point image P30, an image of another marine vessel may be set as the feature point image P30.

The controller 270 is configured or programmed to acquire (calculate) the distance D between the vessel body 1 and the object Q based on the coordinate position of the feature point image P30 in the images P1 to P4. The distance D between the vessel body 1 and the object Q corresponds to a distance between the coordinate position of the feature point image P30 and the coordinate position of the image P11 of the vessel body 1. The controller 270 is configured or programmed to perform a control to switch an image displayed on a display 40 from a bird's-eye view image BV to an object image P10 based on the acquired distance D becoming equal to or less than a threshold distance Dt. The remaining structures of the second preferred embodiment are similar to those of the first preferred embodiment.

Figure 11:
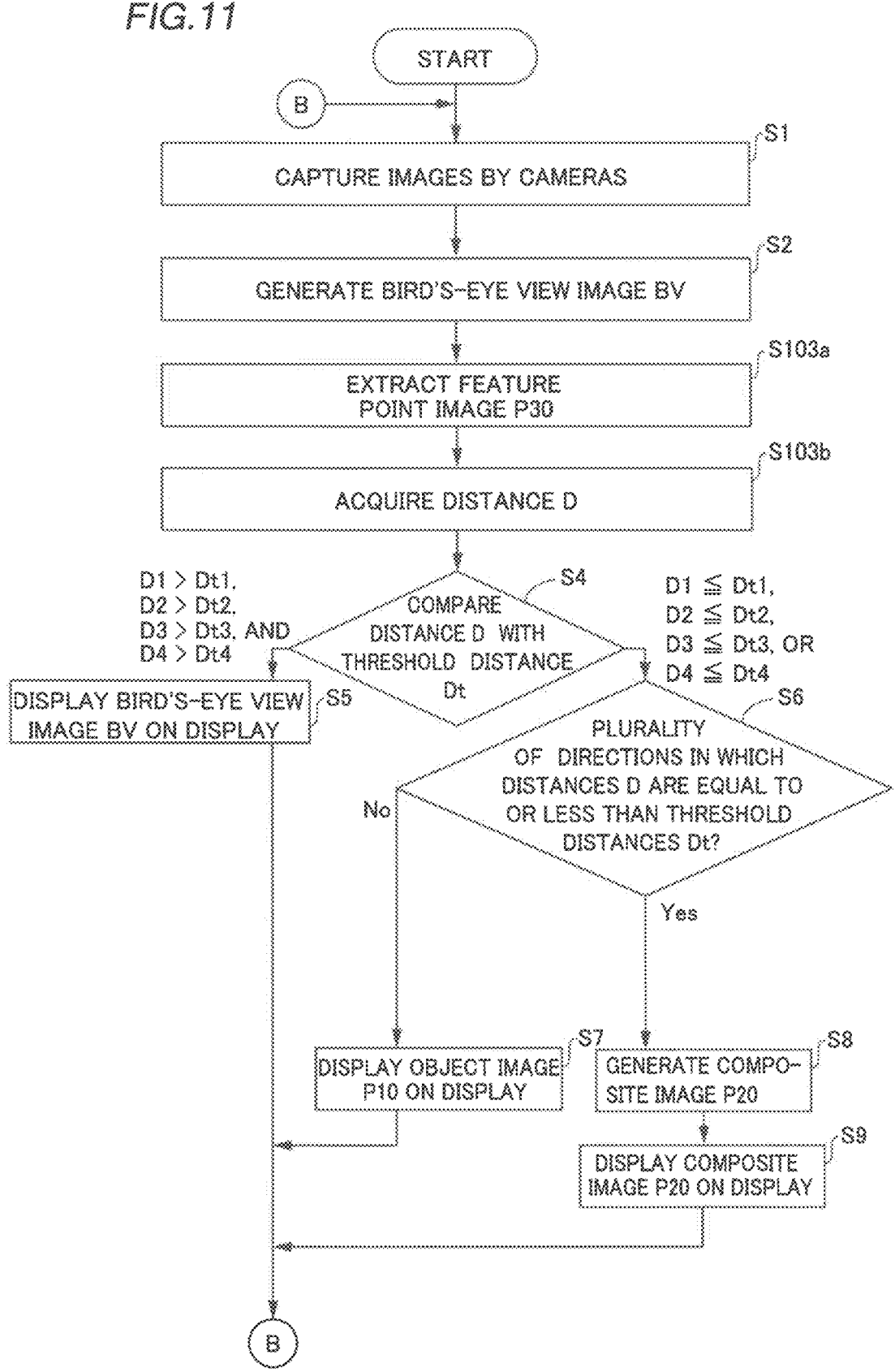
FIG. 11 is a flowchart illustrating an image display method according to the second preferred embodiment of the present invention.

An image display method of the display device 203 of the marine vessel 200 according to the second preferred embodiment is now described with reference to FIG. 11. In the second preferred embodiment, step S103a and step S103b are executed instead of step S3 in the image display method according to the first preferred embodiment.

In step S103a, the image (feature point image P30) of the object Q is extracted from the images P1 to P4 captured by the cameras 21 to 24. Thereafter, in step S103b, the distance D is acquired (calculated) based on the coordinate position of the feature point image P30. In the remaining steps, the process is executed in the same manner as in the first preferred embodiment.

According to the second preferred embodiment of the present invention, the following advantageous effects are achieved.

According to the second preferred embodiment of the present invention, the controller 270 is configured or programmed to acquire the distance D based on the image (feature point image P30) of the object Q in the images P1 to P4 captured by the cameras 21 to 24, and to perform a control to switch the image displayed on the display 40 from the bird's-eye view image BV to the object image P10 based on the acquired distance D becoming equal to or less than the threshold distance Dt. Accordingly, the distance D is acquired by the controller 270 without providing a distance detector 50 as in the first preferred embodiment. Consequently, an increase in the types of components of the display device 203 for the marine vessel 200 is significantly reduced or prevented.

According to the second preferred embodiment of the present invention, the image of the object Q includes the feature point image P30 of the pier or another marine vessel. Furthermore, the image processor 230 extracts the feature point image P30 of the pier or another marine vessel from the images P1 to P4 captured by the cameras 21 to 24. Accordingly, the image of the object Q (the feature point image P30 of the pier or another marine vessel) is easily detected from the captured images P1 to P4, and thus based on the captured images P1 to P4, the distance D is easily acquired, or the object Q is easily detected. The remaining advantageous effects of the second preferred embodiment are similar to those of the first preferred embodiment.

Third Preferred Embodiment

Figure 12:
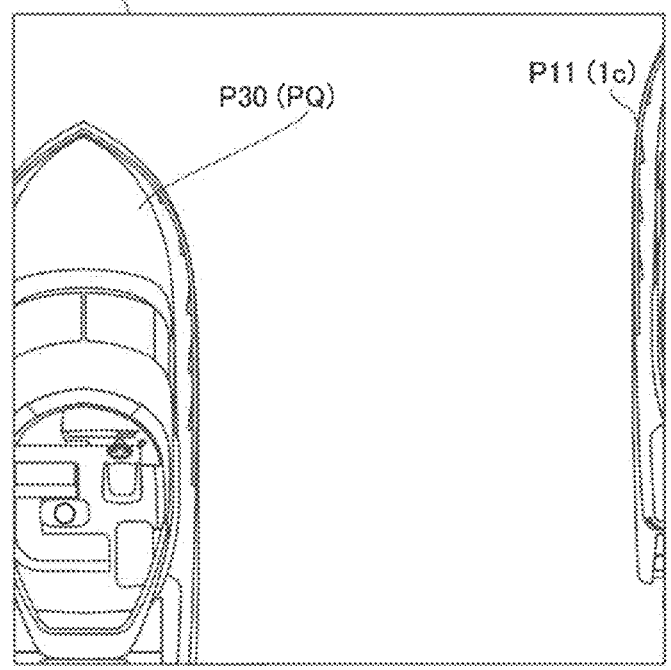
FIG. 12 is a diagram illustrating object image detection according to the third preferred embodiment of the present invention.
Figure 13:
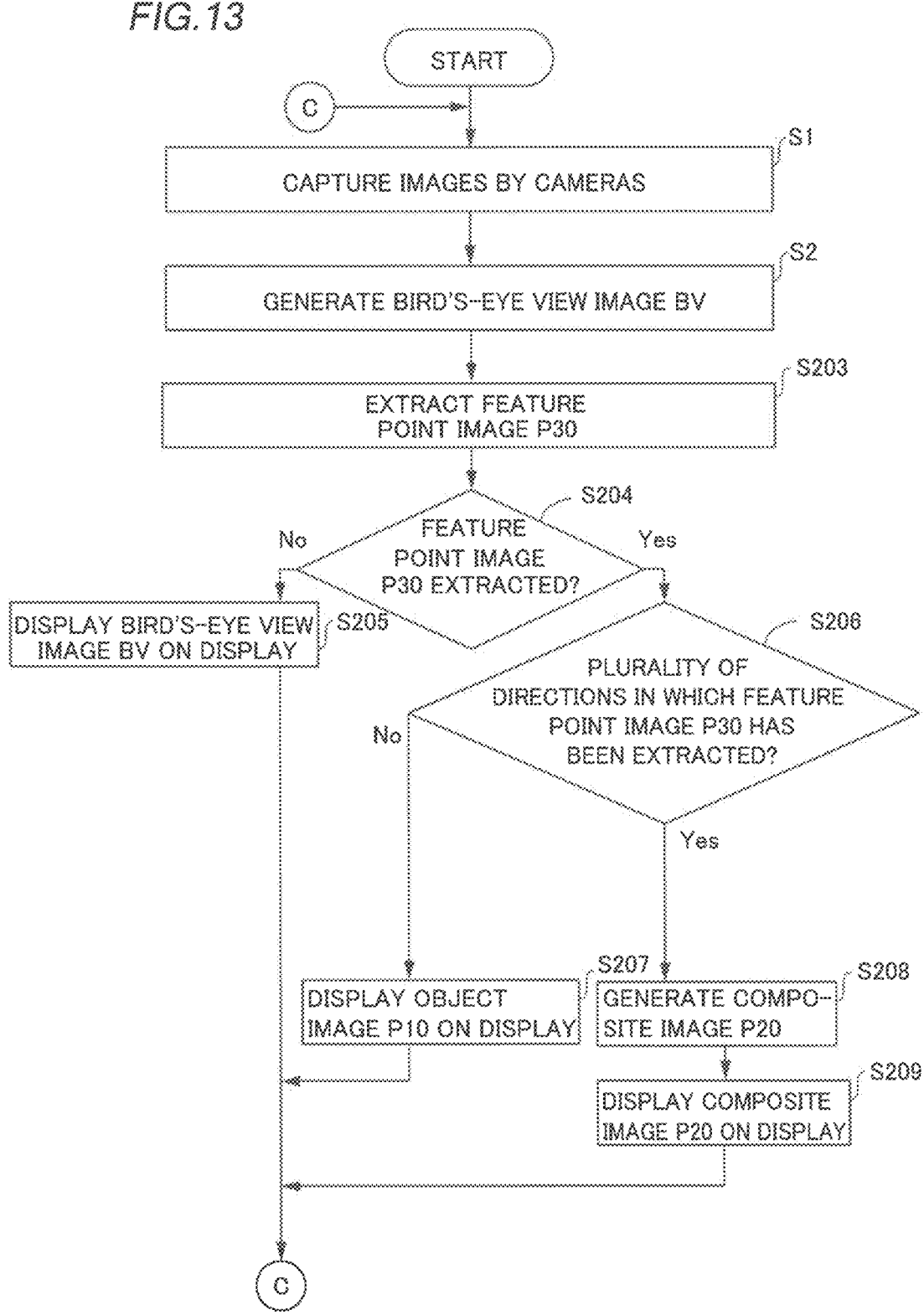
FIG. 13 is a flowchart illustrating an image display method according to the third preferred embodiment of the present invention.

The structure of a marine vessel 300 according to a third preferred embodiment of the present invention is now described with reference to FIGS. 9 and 12. In the third preferred embodiment, an image displayed on a display 40 is switched from a bird's-eye view image BV to an object image P10 or a composite image P20 based on an image of an object Q being detected from images P1 to P4, unlike the first preferred embodiment in which the image displayed on the display 40 is switched from the bird's-eye view image BV to the object image P10 or the composite image P20 based on the distance D becoming equal to or less than the threshold distance Dt. In the third preferred embodiment, the same or similar structures as those of the first and second preferred embodiments are denoted by the same reference numerals, and description thereof is omitted.

In the third preferred embodiment, as shown in FIG. 9, the marine vessel 300 includes a display device 303. The display device 303 includes an image processor 330 and a controller 370. As shown in FIG. 12, the image processor 330 performs a process of extracting the image (feature point image P30: an image of another marine vessel in FIG. 12) of the object Q from the images P1 to P4 captured by the cameras 21 to 24.

The controller 370 is configured or programmed to perform a control to switch the image displayed on the display 40 from the bird's-eye view image BV to the object image P10 based on object information E. In the third preferred embodiment, the object information E indicates that the feature point image P30 has been extracted from the images P1 to P4. The controller 370 is configured or programmed to control the image processor 330 to generate the composite image P20 by combining the images P1 to P4 corresponding to images from which the feature point image P30 has been extracted when the feature point image P30 is extracted from a plurality of images among the images P1 to P4. Furthermore, the controller 370 is configured or programmed to control the display 40 to display the composite image P20. The remaining structures of the third preferred embodiment are similar to those of the first preferred embodiment.

An image display method of the display device 303 of the marine vessel 300 according to the third preferred embodiment is now described. In the third preferred embodiment, step S203 to step S209 are executed instead of step S3 to step S9 in the image display method according to the first preferred embodiment.

In step S203, the image (feature point image P30) of the object Q is extracted from the images P1 to P4 captured by the cameras 21 to 24. Thereafter, the process advances to step S204.

In step S204, it is determined whether or not the feature point image P30 has been extracted from the images P1 to P4. When the feature point image P30 has not been extracted from the images P1 to P4 (when the object Q has not been detected), the process advances to step S205. When the feature point image P30 has been extracted from the images P1 to P4 (when the object Q has been detected), the process advances to step S206.

In step S205, the bird's-eye view image BV is displayed on the display 40. Then, the process returns to step S1. That is, the bird's-eye view image BV is displayed on the display 40 until the feature point image P30 is extracted from the images P1 to P4.

In step S206, it is determined whether or not there are a plurality of directions (images) in which the feature point image P30 has been extracted among the images P1 to P4. When there are not the plurality of directions (images) in which the feature point image P30 has been extracted (there is one), the process advances to step S207. When there are the plurality of directions (images) in which the feature point image P30 has been extracted, the process advances to step S208.

In step S207, the object image P10 corresponding to the image from which the feature point image P30 has been extracted among the images P1 to P4 is displayed on the display 40. Then, the process returns to step S1. That is, the image displayed on the display 40 is switched from the bird's-eye view image BV to the object image P10, which is an image corresponding to the direction in which the object Q has been detected among the images P1 to P4, based on the object information E.

In step S208, the composite image P20 is generated. That is, the composite image P20 is generated in which the object images P10 corresponding to the images from which the feature point image P30 has been extracted have been combined. Thereafter, the process advances to step S209.

In step S209, the composite image P20 is displayed on the display 40. Then, the process returns to step S1. In the remaining steps, the process is executed in the same manner as in the first preferred embodiment.

According to the third preferred embodiment of the present invention, the following advantageous effects are achieved.

According to the third preferred embodiment of the present invention, the controller 370 is configured or programmed to perform a control to switch the image displayed on the display 40 from the bird's-eye view image BV to the object image P10 based on the image of the object Q being detected from the images captured by the cameras 21 to 24. Accordingly, the image displayed on the display 40 is switched from the bird's-eye view image BV to the object image P10 without performing a process of comparing the distance D with a threshold distance Dt. The remaining advantageous effects of the third preferred embodiment are similar to those of the first preferred embodiment.

Fourth Preferred Embodiment

The structure of a marine vessel 400 according to a fourth preferred embodiment of the present invention is now described with reference to FIGS. 14 to 16. In the fourth preferred embodiment, an object image P110 and a composite image P120 are generated from images captured by object image cameras 421, 422, 423, and 424, unlike the first preferred embodiment in which the bird's-eye view image BV, the object image P10, and the composite image P20 are generated based on the images P1 to P4 captured by the cameras 21 to 24. In the fourth preferred embodiment, the same or similar structures as those of the first to third preferred embodiments are denoted by the same reference numerals, and description thereof is omitted.

Figure 14:
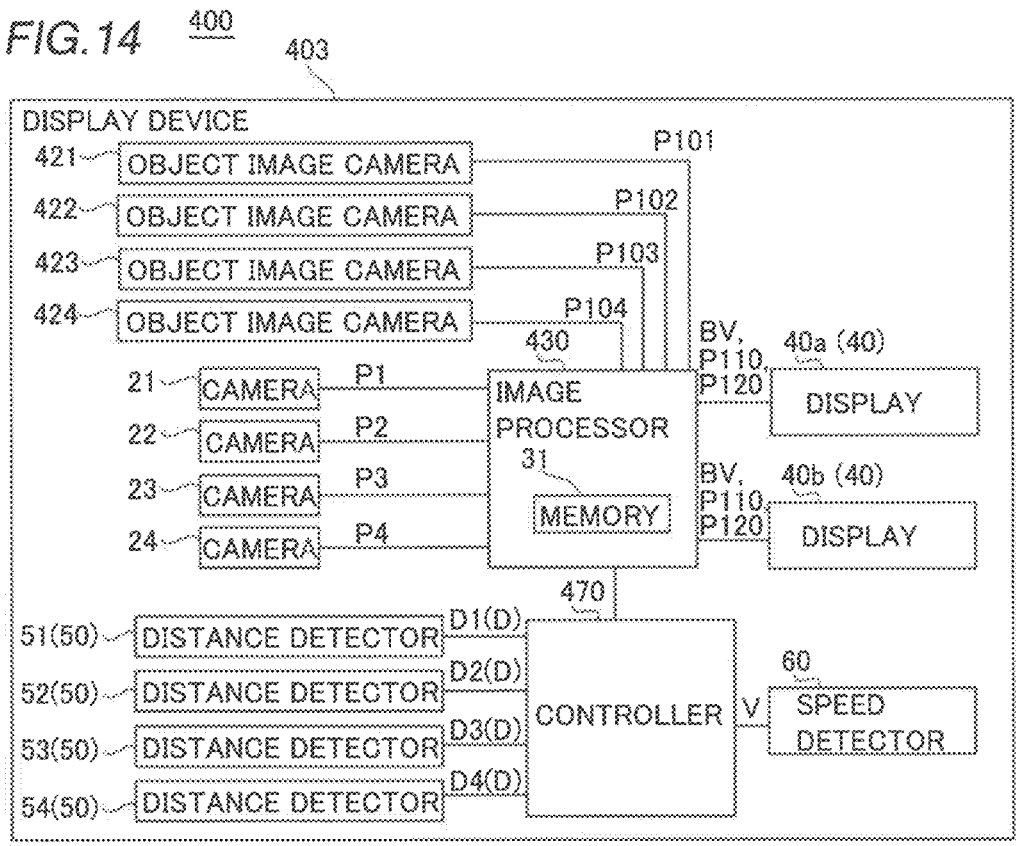
FIG. 14 is a block diagram showing the structure of a display device according to a fourth preferred embodiment of the present invention.

In the fourth preferred embodiment, as shown in FIG. 14, the marine vessel 400 includes a display device 403. The display device 403 includes the object image cameras 421, 422, 423, and 424 configured separately from cameras 21 to 24 in addition to the cameras 21 to 24. In addition, the display device 403 includes an image processor 430 and a controller 470. The object image cameras 421 to 424 are examples of an "object image imager".

Figure 15:
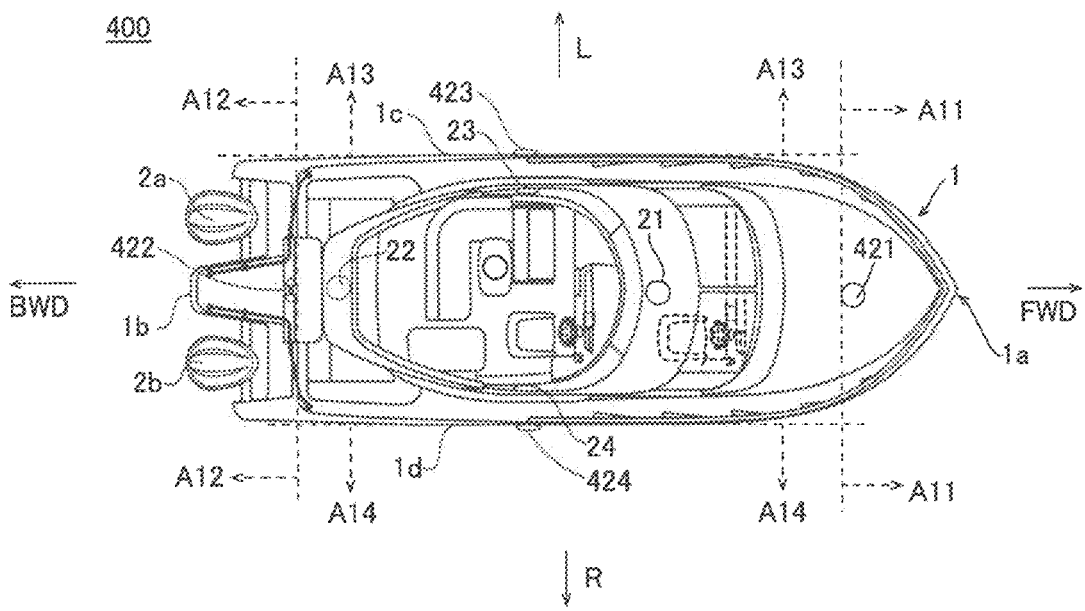
FIG. 15 is a plan view showing a position at which an object image camera according to the fourth preferred embodiment of the present invention is disposed.

As shown in FIG. 15, the object image camera 421 is attached to a portion of a vessel body 1 forward of the camera 21, and images a surrounding region A11 (image P101) forward of the vessel body 1, for example. The object image camera 422 is attached to a portion of the vessel body 1 rearward of the camera 22, and images a surrounding region A12 (image P102) rearward of the vessel body 1, for example. The object image camera 423 is attached to a portion of the vessel body 1 leftward of the camera 23, and images a surrounding region A13 (image P103) leftward of the vessel body 1, for example. The object image camera 424 is attached to a portion of the vessel body 1 rightward of the camera 24, and images a surrounding region A14 (image P104) rightward of the vessel body 1, for example.

The image processor 430 generates a bird's-eye view image BV based on images P1 to P4 captured by the cameras 21 to 24, and generates the object image P110 and the composite image P120 based on the images P101 to P104 captured by the object image cameras 421 to 424.

The controller 470 is configured or programmed to perform a control to switch an image displayed on a display 40 from the bird's-eye view image BV to the object image P110 or the composite image P120 captured by the image cameras 421 to 424 based on object information E. The remaining structures of the fourth preferred embodiment are similar to those of the first preferred embodiment.

An image display method of the display device 403 of the marine vessel 400 according to the fourth preferred embodiment is now described. In the fourth preferred embodiment, step S301, step S307, step S308, and step S309 are executed instead of step S1, step S7, step S8, and step S9 in the image display method according to the first preferred embodiment.

In step S301, regions A1 to A4 are imaged by the cameras 21 to 24, and the regions A11 to A14 are imaged by the object image cameras 421 to 424.

In step S307, the object image P110 corresponding to a distance D (direction) that is equal to or less than a threshold distance Dt is displayed on the display 40. Then, the process returns to step S1. That is, in step S307, the image displayed on the display 40 is switched from the bird's-eye view image BV to the object image 110 obtained by imaging in a direction toward an object Q from the vessel body 1 based on the distance D becoming equal to or less than the threshold distance Dt (object information E).

That is, the image displayed on the display 40 is switched from the bird's-eye view image BV to the object image P110, which is an image corresponding to a direction in which the distance D is equal to or less than the threshold distance Dt among the images P101 to P104 respectively corresponding to a plurality of directions, based on the object information E.

In step S308, the composite image P120 is generated. That is, the composite image P120 in which object images P110 corresponding to distances D (directions) that are equal to or less than threshold distances Dt have been combined is generated.

In step S309, the composite image P120 is displayed on the display 40. In the remaining steps, the process is executed in the same manner as in the first preferred embodiment.

According to the fourth preferred embodiment of the present invention, the following advantageous effects are achieved.

According to the fourth preferred embodiment of the present invention, the cameras 21 to 24 capture the images P1 to P4 of the vessel body 1 and the regions A1 to A4 around the vessel body 1 to generate the bird's-eye view image BV. The object image cameras 421 to 424 are configured separately from the cameras 21 to 24, and capture the object image P110. The image processor 430 generates the bird's-eye view image BV based on the images P1 to P4 of the vessel body 1 and the regions A1 to A4 around the vessel body 1 captured by the cameras 21 to 24. Furthermore, the controller 470 is configured or programmed to perform a control to switch the image displayed on the display 40 from the bird's-eye view image BV to the object image P110 captured by the object image cameras 421 to 424 based on the object information E. Accordingly, the object image cameras 421 to 424 suitable for imaging the object Q are configured separately from the cameras 21 to 24. Consequently, a more appropriate object image P110 captured by the object image cameras 421 to 424 is visually recognized by a marine vessel operator. The remaining advantageous effects of the fourth preferred embodiment are similar to those of the first preferred embodiment.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

For example, while the propulsion devices are preferably configured as outboard motors in each of the first to fourth preferred embodiments described above, the present invention is not restricted to this. For example, the propulsion devices may alternatively be configured as inboard motors or inboard/outboard motors, or jet propulsion devices may alternatively be provided.

While the cameras preferably image both portions of the vessel body and the regions outside the vessel body in each of the first to fourth preferred embodiments described above, the present invention is not restricted to this. For example, the cameras may alternatively image only the regions outside the vessel body.

While the distance D is preferably acquired in the four directions: forward, rearward, leftward, and rightward directions in each of the first and second preferred embodiments described above, the present invention is not restricted to this. That is, the distance D may alternatively be acquired in a number of directions other than four. For example, the distance D may also be acquired in a direction between the forward direction and the leftward direction, a direction between the forward direction and the rightward direction, a direction between the rearward direction and the leftward direction, and a direction between the rearward direction and the rightward direction, and the image on the display may be switched from the bird's-eye view image to the object image based on the acquired distances D.

While the threshold distances Dt (Dt1 to Dt4) are preferably set in the four directions, respectively, in each of the first and second preferred embodiments described above, the present invention is not restricted to this. For example, one common threshold distance Dt may alternatively be set in the four directions.

While the threshold distance Dt is preferably set to a certain ratio of the dimension of the vessel body 1 in each of the first and second preferred embodiments described above, the present invention is not restricted to this. For example, the controller may alternatively be configured or programmed to allow the marine vessel operator to set the threshold distance Dt to an arbitrary value.

While the composite image is preferably generated by combining two images in each of the first to fourth preferred embodiments described above, the present invention is not restricted to this. For example, the composite image may alternatively be generated by combining three or more images.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine vessel display device comprising:
an imager that images surroundings of a vessel body;
an image processor that generates a bird's-eye view image that is based on images captured by the imager and shows an entire circumference of the vessel body in such a manner as to virtually look down at the vessel body from above the vessel body;
a display provided in the vessel body and that displays the bird's-eye view image; and
a controller configured or programmed to perform a control to automatically switch an image displayed on the display from the bird's-eye view image to an object image obtained by imaging in a direction toward an object located outside the vessel body from the vessel body based on object information that includes information indicating that a distance between the vessel body and the object has become equal to or less than a predetermined distance; wherein
the predetermined distance in a forward-rearward direction of the vessel body is set to be equal to or less than a length of the vessel body in the forward-rearward direction.

2. The marine vessel display device according to claim 1, wherein
the imager images a side of the vessel body in a docking direction and surroundings of the side in the docking direction; and
the object image includes an image of the side in the docking direction and the surroundings of the side in the docking direction.

3. The marine vessel display device according to claim 1, wherein
the imager captures images respectively corresponding to a plurality of directions outward from the vessel body; and
the controller is configured or programmed to perform a control to switch the image displayed on the display from the bird's-eye view image to the object image, which is an image corresponding to a direction in which the distance between the vessel body and the object is equal to or less than the predetermined distance among the images respectively corresponding to the plurality of directions, based on the object information.

4. The marine vessel display device according to claim 3, wherein
the controller is configured or programmed to, when there are a plurality of directions in which the distance between the vessel body and the object is equal to or less than the predetermined distance, perform a control to switch the image displayed on the display from the bird's-eye view image to the object image corresponding to each of the plurality of directions; and
the display displays, on a same screen, the object image corresponding to each of the plurality of directions.

5. The marine vessel display device according to claim 1, wherein
the imager includes a bird's-eye view image imager that captures images of the vessel body and the surroundings of the vessel body to generate the bird's-eye view image, the bird's-eye view image imager defining and functioning as an object image imager that images the object image; and
the image processor generates the bird's-eye view image based on the images of the vessel body and the surroundings of the vessel body captured by the imager, and generates the object image based on some of the images of the vessel body and the surroundings of the vessel body captured by the imager and the object information.

6. The marine vessel display device according to claim 1, wherein
the imager includes a bird's eye view image imager that captures images of the vessel body and the surroundings of the vessel body to generate the bird's eye view image;
the marine vessel display device further comprises an object image imager that captures the object image;
the bird's eye view image imager and the object image imager are separate from each other;
the image processor generates the bird's-eye view image based on the images of the vessel body and the surroundings of the vessel body captured by the bird's-eye view image imager; and
the controller is configured or programmed to perform a control to switch the image displayed on the display from the bird's-eye view image to the object image captured by the object image imager based on the object information.

7. The marine vessel display device according to claim 1, further comprising:
a distance detector that detects the distance between the vessel body and the object; wherein
the controller is configured or programmed to perform a control to switch the image displayed on the display from the bird's-eye view image to the object image based on the distance between the vessel body and the object detected by the distance detector becoming equal to or less than the predetermined distance.

8. The marine vessel display device according to claim 1, wherein the controller is configured or programmed to acquire the distance between the vessel body and the object based on an image of the object in the images captured by the imager, and to perform a control to switch the image displayed on the display from the bird's-eye view image to the object image based on the distance between the vessel body and the object that has been acquired becoming equal to or less than the predetermined distance.

9. The marine vessel display device according to claim 1, wherein
the controller is configured or programmed to perform a control to switch the image displayed on the display from the bird's-eye view image to the object image when the distance between the vessel body and the object is equal to or less than the predetermined distance, which is equal to or less than a ratio of a dimension of the vessel body in the forward-rearward direction or a left-right direction; and
the ratio is less than 1.

10. The marine vessel display device according to claim 1, further comprising:
a vessel speed detector that detects a vessel speed of the vessel body; wherein
the controller is configured or programmed to perform a control to set the predetermined distance to a larger distance as the vessel speed detected by the vessel speed detector increases.

11. The marine vessel display device according to claim 1, wherein the controller is configured or programmed to perform a control to switch the image displayed on the display from the bird's-eye view image to the object image based on an image of the object being detected from the images captured by the imager.

12. The marine vessel display device according to claim 8, wherein
the image of the object includes a feature point image of a pier or another marine vessel; and
the image processor extracts the feature point image of the pier or another marine vessel from the images captured by the imager.

13. The marine vessel display device according to claim 1, wherein the display that displays the bird's-eye view image and the object image is located adjacent to or in a vicinity of an operation seat in the vessel body.

14. A marine vessel comprising:
a vessel body;
an imager that images surroundings of the vessel body;
an image processor that generates a bird's eye view image that is based on images captured by the imager and shows an entire circumference of the vessel body in such a manner as to virtually look down at the vessel body from above the vessel body;
a display provided in the vessel body and that displays the bird's-eye view image; and
a controller configured or programmed to perform a control to automatically switch an image displayed on the display from the bird's-eye view image to an object image obtained by imaging in a direction toward an object located outside the vessel body from the vessel body based on object information that includes information indicating that a distance between the vessel body and the object has become equal to or less than a predetermined distance; wherein
the predetermined distance in a forward-rearward direction of the vessel body is set to be equal to or less than a length of the vessel body in the forward-rearward direction.

15. An image display method for a marine vessel, the method comprising:
imaging surroundings of a vessel body;
generating a bird's eye view image based on images of the surroundings of the vessel body that have been captured, the bird's eye view image shows an entire circumference of the vessel body in such a manner as to virtually look down at the vessel body from above the vessel body;
displaying the bird's eye view image; and
automatically switching a displayed image from the bird's-eye view image to an object image obtained by imaging in a direction toward an object located outside the vessel body from the vessel body based on object information that includes information indicating that a distance between the vessel body and the object has become equal to or less than a predetermined distance; wherein
the predetermined distance in a forward-rearward direction of the vessel body is set to be equal to or less than a length of the vessel body in the forward-rearward direction.

16. The image display method for a marine vessel according to claim 15, wherein
the imaging of the surroundings of the vessel body includes imaging a side of the vessel body in a docking direction and surroundings of the side in the docking direction; and
the switching of the displayed image includes switching the displayed image from the bird's-eye view image to the object image including an image of the side in the docking direction and the surroundings of the side in the docking direction based on the object information.

17. The image display method for a marine vessel according to claim 15, wherein
the imaging of the surroundings of the vessel body includes capturing images respectively corresponding to a plurality of directions outward from the vessel body; and
the switching of the displayed image includes switching the displayed image from the bird's-eye view image to the object image, which is an image corresponding to a direction in which the distance between the vessel body and the object is equal to or less than the predetermined distance among the images respectively corresponding to the plurality of directions, based on the object information.

18. The image display method for a marine vessel according to claim 17, wherein
the switching of the displayed image includes switching, when there are a plurality of directions in which the distance between the vessel body and the object is equal to or less than the predetermined distance, the displayed image from the bird's-eye view image to the object image corresponding to each of the plurality of directions and displaying, on a same screen of a display, the object image corresponding to each of the plurality of directions.

19. The image display method for a marine vessel according to claim 15, wherein
the imaging of the surroundings of the vessel body includes capturing images of the vessel body and the surroundings of the vessel body to generate the bird's-eye view image and capturing the object image; and
the image display method further comprises generating the object image based on some of the images of the vessel body and the surroundings of the vessel body that have been captured and the object information.

20. The image display method for a marine vessel according to claim 15, wherein
the imaging of the surroundings of the vessel body includes capturing, by a bird's eye view image imager, images of the vessel body and the surroundings of the vessel body to generate the bird's eye view image and capturing the object image by an object image imager separate from the bird's eye view image imager;

the generating of the bird's eye view image includes generating the bird's-eye view image based on the images of the vessel body and the surroundings of the vessel body captured by the bird's-eye view image imager; and the switching of the displayed image includes switching the displayed image from the bird's-eye view image to the object image captured by the object image imager based on the object information.

\* \* \* \* \*